Patented Sept. 19, 1922.

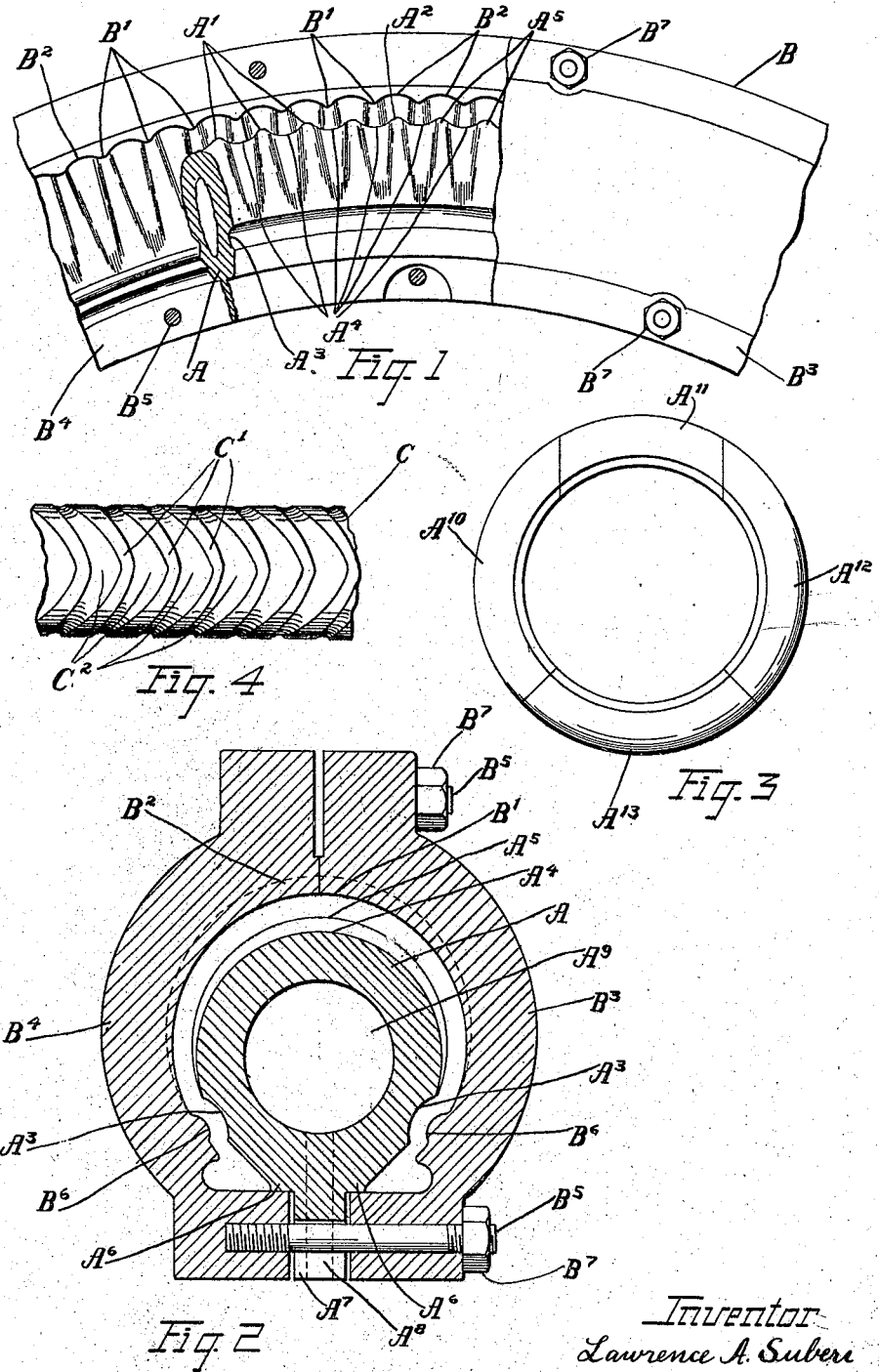

1,429,377

UNITED STATES PATENT OFFICE.

LAWRENCE A. SUBERS, OF LAKEWOOD, OHIO.

MOLD FOR TRANSVERSE AND ANNULAR PNEUMATIC TIRES.

Application filed December 13, 1920. Serial No. 430,443.

*To all whom it may concern:*

Be it known that I, LAWRENCE A. SUBERS, a citizen of the United States, and a resident of Lakewood, county of Cuyahoga, and State of Ohio, have invented a new and useful Improvement in Molds for Transverse and Annular Pneumatic Tires, of which the following is a specification, the principle of the invention being herein explained and the best mode in which I have contemplated applying that principle, so as to distinguish it from other inventions.

The objects of the invention are to provide a mold in which to permanently fix by vulcanization transverse and annular corrugations in the carcass or body of a fabric tire.

It is requisite that the tire shall be constructed on a form having exactly the same transverse and annular corrugations as the mold in which it is vulcanized. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Fig. 1 shows a side view of a portion of the mold, with a part of the outer half removed; Fig. 2 shows a transverse section of the mold, showing the inner core and the outer compression member; Fig. 3 shows a side view at a smaller scale of a typical method of a four part core, for purpose of removal from a tire casing after vulcanization, and Fig. 4 is a plan view of a modified form of core.

As shown, there is a tire core A and a suitable complementary mold B, the core being made up of four sections $A^{11}$, $A^{12}$, $A^{13}$ and $A^{14}$ as shown in Fig. 3 to allow the entrance into the tire before vulcanization and its subsequent extraction, and having an annular lug or rib $A^7$ which is used to center the core within the mold. The mold is made up in halves $B^3$ and $B^4$ fastened together at suitable intervals by means of studs $B^5$ and nuts $B^7$, which are spaced around the mold. At the bottom, the studs $B^5$ also pass through suitable apertures in the lug or rib $A^7$ to secure the core in position. These studs and nuts are so spaced as to hold the core and mold securely together.

The core A is provided with exterior transverse corrugations $A^1$ which are shown to be symmetrical and at right angles to the circumferential axis, of greatest depth and height at the outer periphery $A^2$ and to diminish toward the bead, vanishing at an annular corrugation $A^3$ which is near the bead portion on each side of the core. The mold is similarly corrugated but has the transverse projection $B^1$ radially opposite the depressions $A^4$ of the core, and its depressions $B^2$ radially opposite the projections $A^5$ on the core.

The mold halves are also provided with annular projections $B^6$ which correspond to the annular depressions $A^3$ in the core and which are radially opposite the same to provide the annular corrugation in the finished tire.

In Fig. 4 a modified form of core C is shown which has transverse corrugations with the projections $C^1$ and the depressions $C^2$. In this form the projections and depressions are symmetrical in regard to the greatest periphery of the core C but at a reverse angle on each side of the center line of the core, thereby forming a "chevron type" of corrugation. When made in this form these corrugations may be made at any suitable angle and will be continuous as in the other forms. It will be obvious that the interior of the mold will be similar to the core with complementary "chevron type" of corrugations.

In use, the fabric tire, which has been constructed upon a form with exactly similar transverse and annular corrugations to those of the mold, is placed upon the core A, the mold B is fastened securely thereover at the requisite pressure, and the whole placed in the vulcanizer for vulcanization.

While the drawing shows the transverse corrugations at right angles to the circumferential axis it is evident that these corrugations may be at any angle to this axis and may be continuous at this angle from bead to bead or may be arranged at a reverse angle on each half of the mold, meeting in a point at the greatest periphery of the core or mold.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device for the securing and compression of a fabric tire, during vulcanization, the combination of a core and mold, each provided with continuous series of complementary transverse corrugations and an annular corrugation at each side.

2. In a device for the securing and compression of a fabric tire, during vulcanization, the combination of a core and mold, each provided with an annular corrugation at each side and continuous series of complementary transverse corrugations at a predetermined angle to the circumferential axis.

3. In a device for the securing and compression of a fabric tire during vulcanization, the combination of a core and mold, each provided with an annular corrugation at each side and continuous series of complementary transverse corrugations at a predetermined angle to the circumferential axis, such transverse corrugations being symmetrical in regard to the greatest periphery of the core, and of the greatest depth and height at this portion, diminishing in size equally on each side and vanishing at such annular corrugations.

4. In a device for the securing and compression of a fabric tire during vulcanization, the combination of a core and mold, each provided with an annular corrugation at each side, and continuous series of complementary transverse corrugations symmetrical in regard to the greatest periphery of said core, but at a reverse angle on each side of said core thereby meeting at a point at the greatest periphery.

5. In a device for the securing and compression of a fabric tire during vulcanization, the combination of a core and mold, each provided with an annular corrugation at each side, and continuous series of complementary transverse corrugations symmetrical in regard to the greatest periphery of said core, but at a reverse angle on each side of said core thereby meeting at a point at the greatest periphery, and diminishing in size equally on each side toward the bead and vanishing at such annular corrugations.

Signed by me, this 14th day of October, 1920.

LAWRENCE A. SUBERS.